US012654117B2

(12) United States Patent
    Bernard

(10) Patent No.:     US 12,654,117 B2
(45) Date of Patent:      Jun. 16, 2026

(54) WATER FILTER SYSTEM AND METHOD

(71) Applicant: Keith Bernard, Miramar, FL (US)

(72) Inventor:   Keith Bernard, Miramar, FL (US)

( * ) Notice:   Subject to any disclaimer, the term of this patent is extended or adjusted under 35 U.S.C. 154(b) by 585 days.

(21) Appl. No.: 18/130,742

(22) Filed:   Apr. 4, 2023

(65)         Prior Publication Data

US 2024/0335777 A1     Oct. 10, 2024

(51) Int. Cl.
    *B01D 35/30*        (2006.01)
(52) U.S. Cl.
    CPC ........ *B01D 35/30* (2013.01); *B01D 2201/302*
                (2013.01); *B01D 2201/304* (2013.01)
(58) Field of Classification Search
    CPC .............. B01D 35/30; B01D 2201/302; B01D
                                              2201/304

USPC ......... 210/348, 108, 275, 333.01, 337, 338,
                    210/342, 393, 408, 411, 413, 4, 25, 427,
                                    210/446, 435, 450, 455
    See application file for complete search history.

(56)             References Cited

U.S. PATENT DOCUMENTS 4,216,558  A  *   8/1980   Schultz ................... B63B 17/00
                                                      141/286
    2021/0101096 A1*   4/2021   Bernard ................. B01D 35/30

* cited by examiner

*Primary Examiner* — Madeline Gonzalez
(74) *Attorney, Agent, or Firm* — URADNIK LAW FIRM PA

(57)             ABSTRACT

A pre-filter is provided for placement in series with a backflushing adaptor and an inline filter, the pre-filter including a cavity within which the backflushing adaptor may be at least in part disposed.

4 Claims, 11 Drawing Sheets

150

130

1

WATER FILTER SYSTEM AND METHOD

FIELD OF THE DISCLOSURE

The invention relates generally to system and method for water filtration, and more specifically, to a pre-filter for use in connection with an inline water filter received within a cavity formed by the pre-filter, so as to create a compact pre-filter/filter combination, and an adaptor for use with the pre-filter that permits the pre-filter to be used as a standalone prefilter and can be divided to allow adapter to be used for convenient backflushing of the pre-filter for cleaning the pre-filter.

BACKGROUND

A number of systems exist to filter water. For non-industrial applications where a source of water is a hose and spigot, consumers typically use an inline water filter that is adapted for connection between the spigot or hose, or between two hoses. Such filters may be used, by way of example only, for water provided to campers or to a recreational vehicle while parked at a campsite.

Numerous problems exist with the use of such inline filters. For example, inline filters typically are disposable and need to be changed frequently. They have a limited life span in that once they filter out a certain level of particulates, the inline filter must be changed and disposed of. Inline filters also typically cannot be cleaned for reuse.

Thus, there remains a need for an improved, simple, and cost-effective system and method to extend the life of an inline water filter for consumer use.

SUMMARY

The present disclosure provides a system and method for extending the life of an inline water filter for consumer use. A pre-filter is placed in series with the inline filter. The pre-filter includes a cavity within which the inline filter may be at least in part disposed. In one embodiment, the pre-filter is connected to an adaptor that permits the that permits the prefilter to be used as a standalone filter without use of inline carbon filter. The adaptor may be disassembled to permit backflushing of the pre-filter. In another embodiment, the pre-filter also may be disassembled and cleaned for continued use, thus removing particulates over time that would otherwise help clog the inline filter. Thus, a compact filtering apparatus is provided that extends the useful life of an inline filter.

Other benefits and advantages of the present disclosure will be appreciated from the following detailed description.

DESCRIPTION OF THE DRAWINGS

Exemplary embodiments of an exemplary water pre-filter system and method are shown in the accompanying drawings.

2

Figure 1:
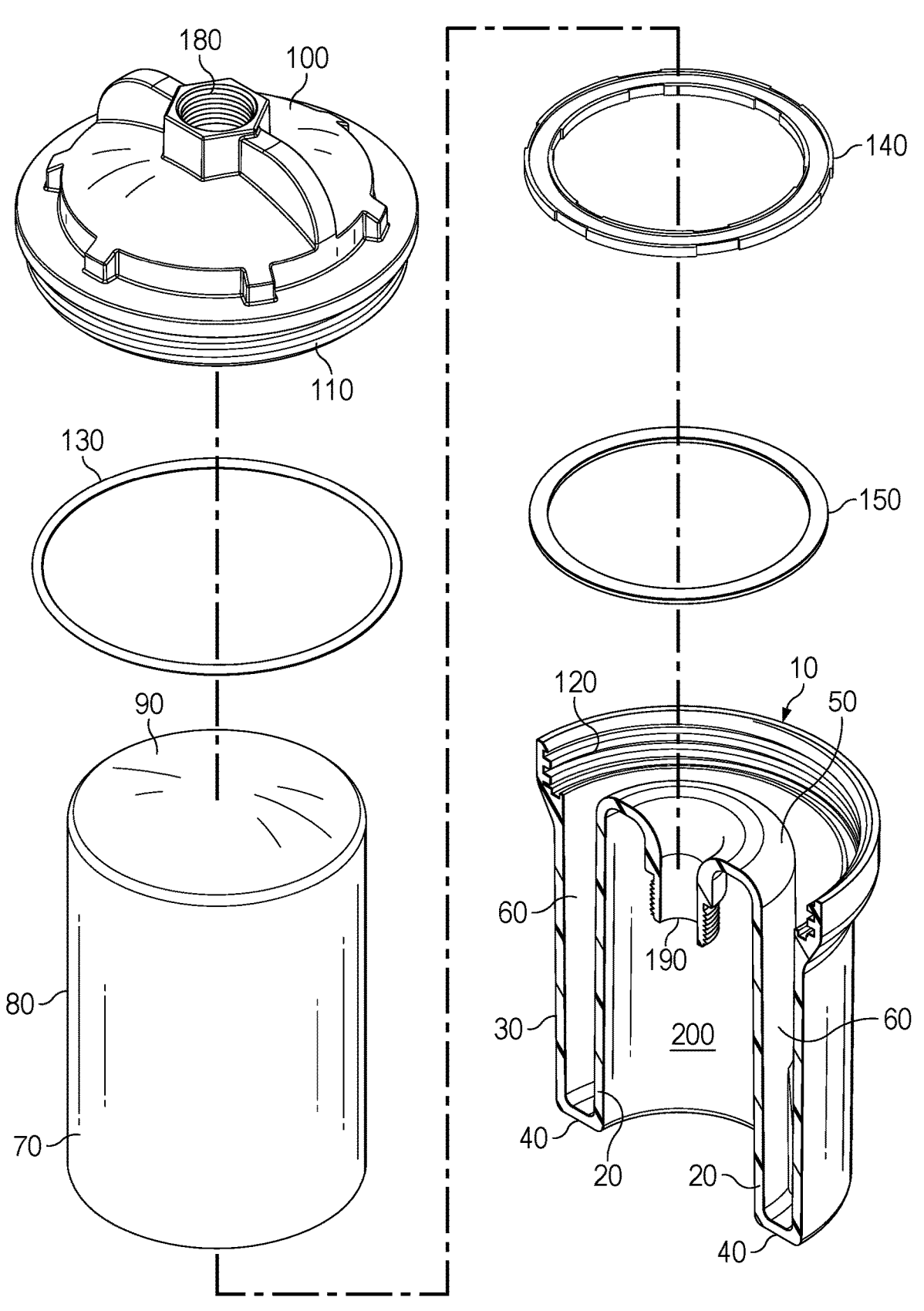
FIG. 1 is a perspective, exploded view in partial cross section of an exemplary embodiment of a consumer water pre-filter system for connection in series with an inline water filter.
Figure 2:
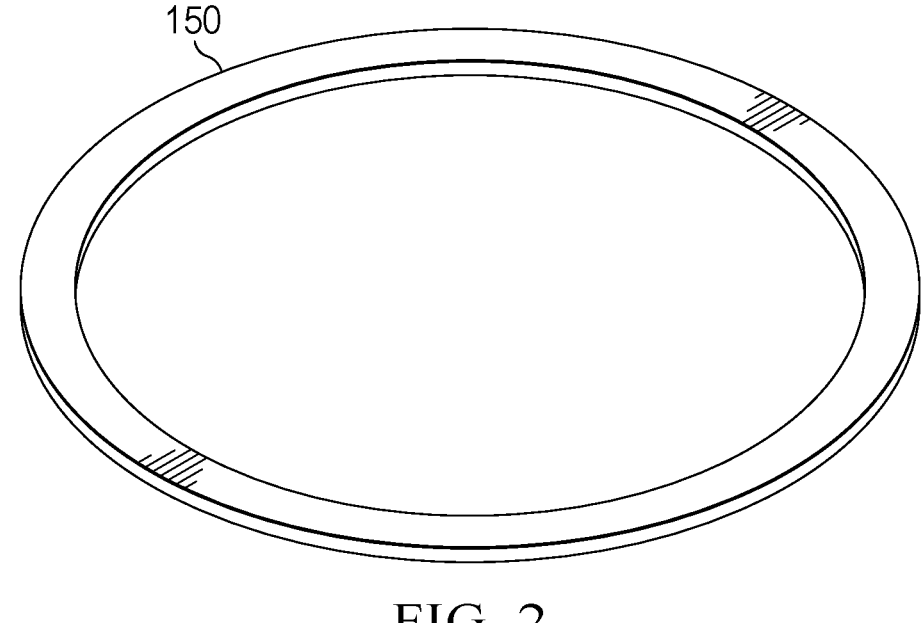
FIG. 2 is a perspective view of an exemplary ring seal for use in the pre-filter system shown in FIG. 1.
Figure 3:
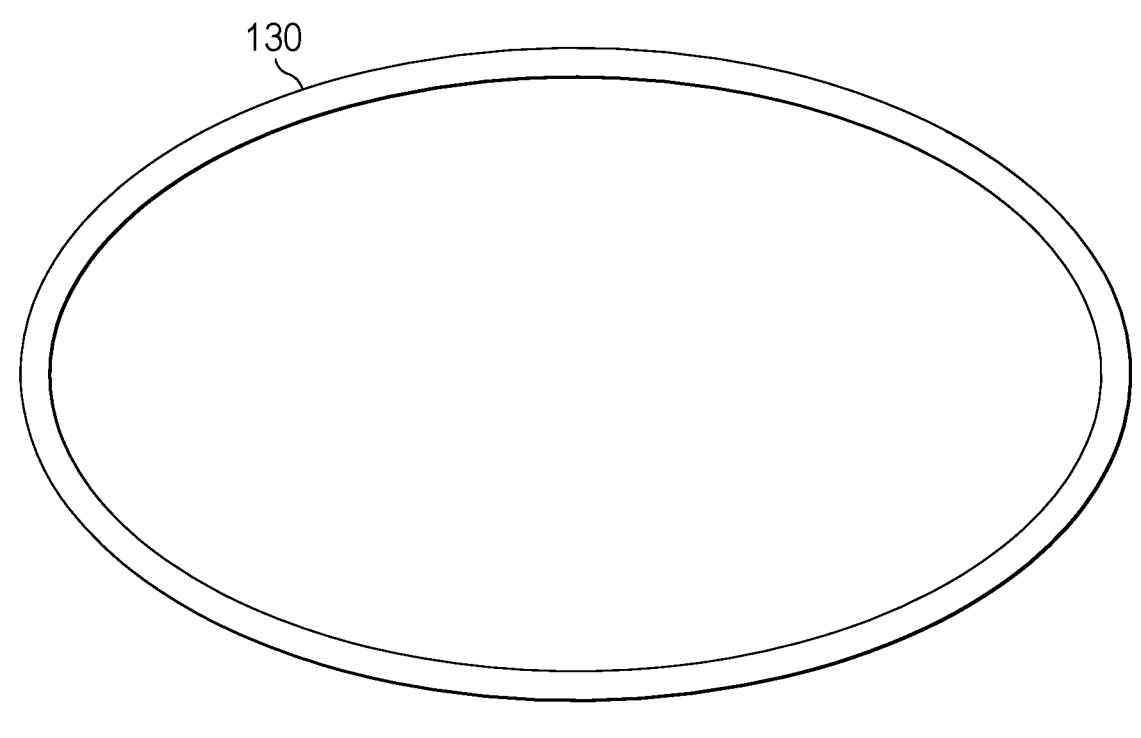
FIG. 3 is a perspective view of an exemplary o-ring for use in the pre-filter system shown in FIG. 1.
Figure 4:
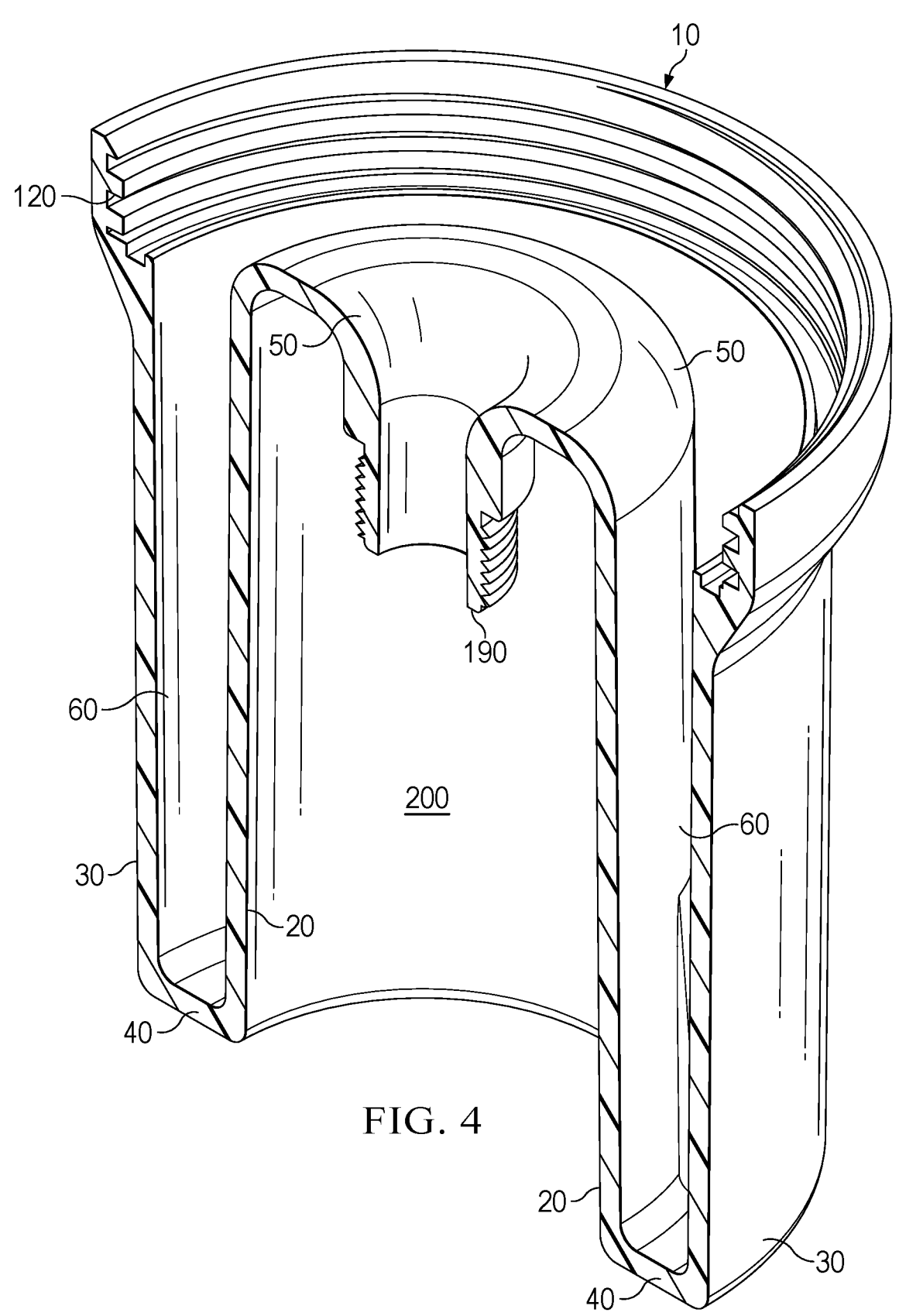

FIG. 4 is a perspective view in cross section of an exemplary housing for use in the pre-filter system shown in FIG. 1.

Figure 5:
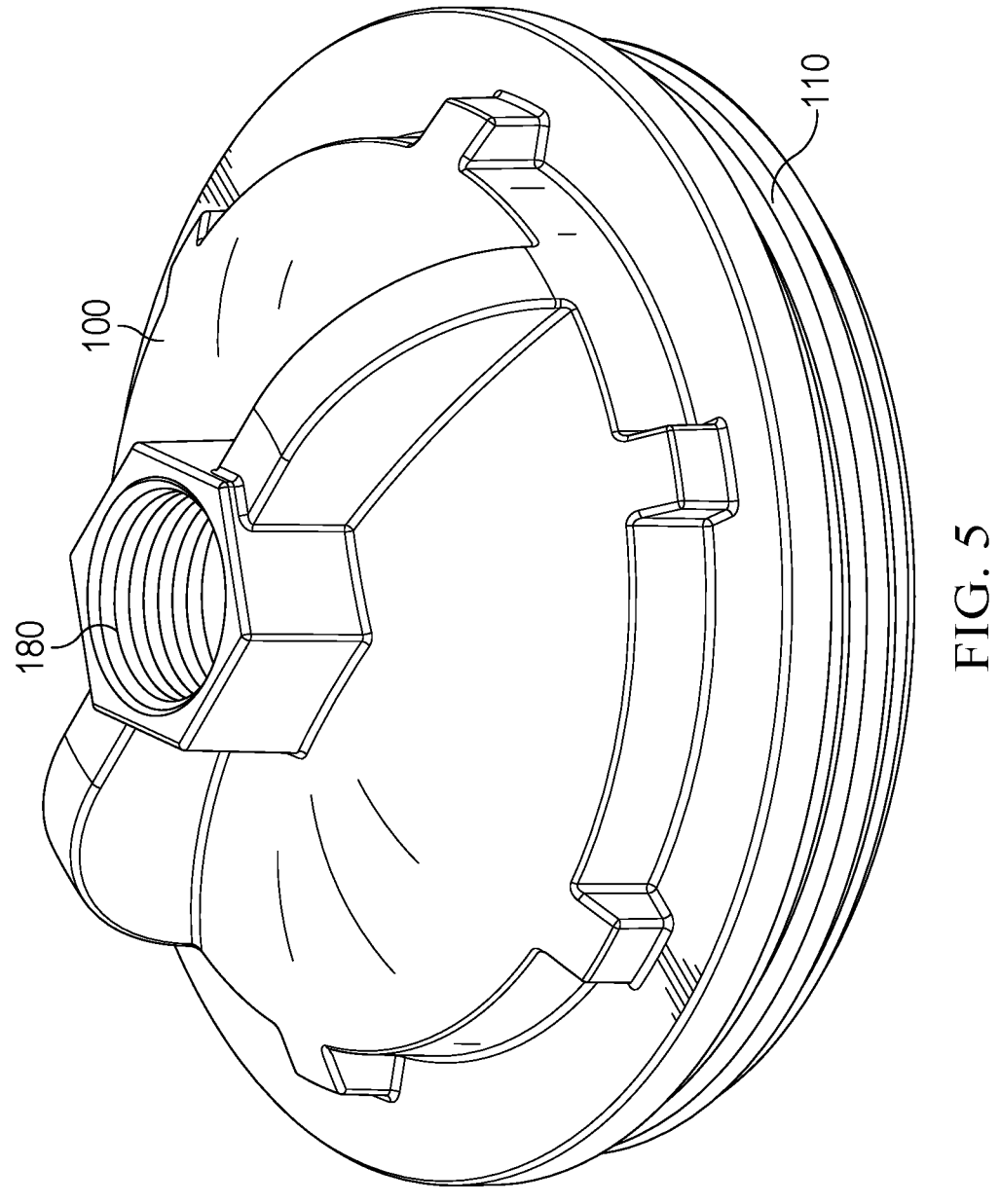

FIG. 5 is a perspective view of an exemplary cap for use in the pre-filter system shown in FIG. 1.

Figure 6:
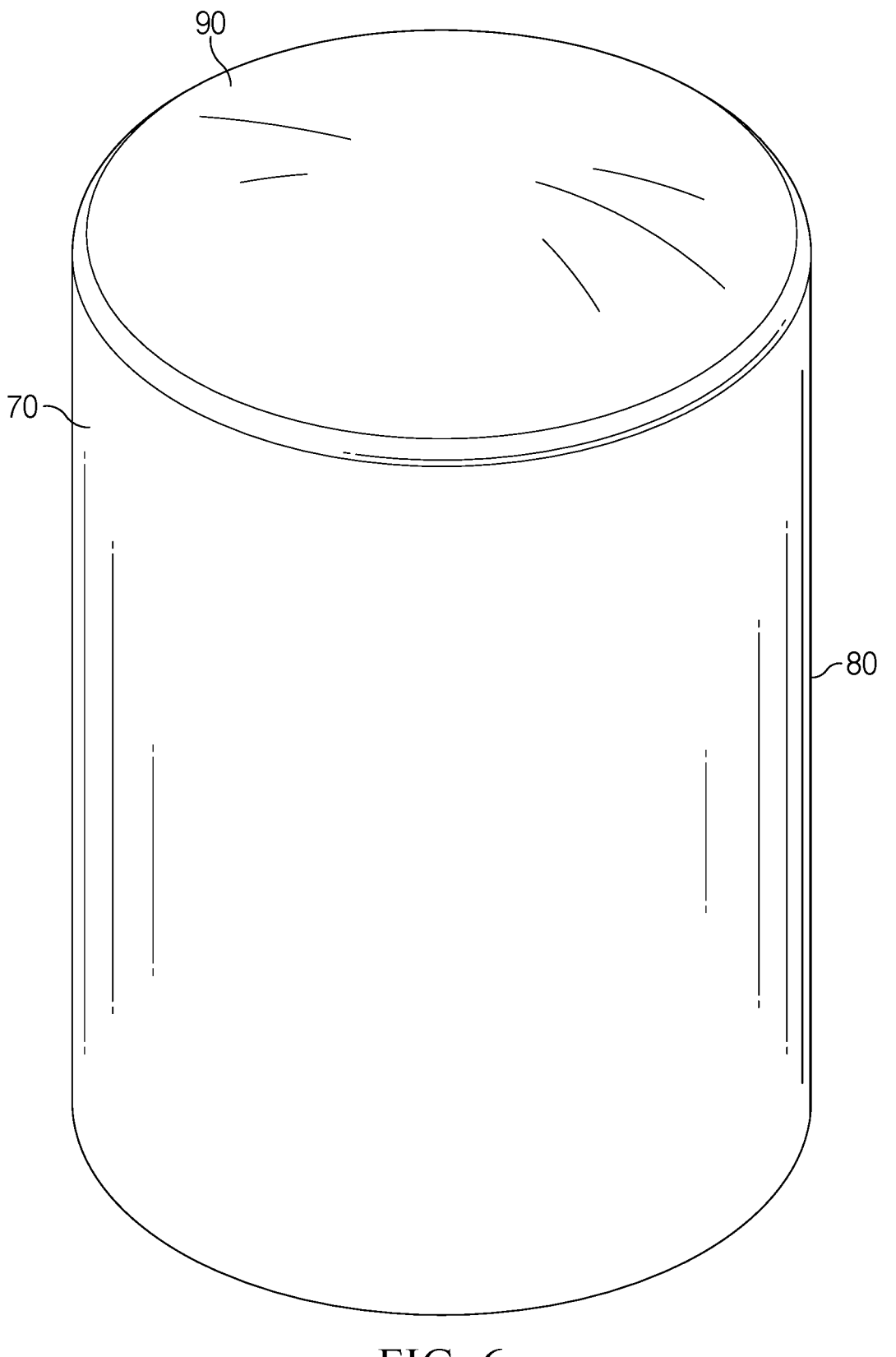

FIG. 6 is a perspective view of an exemplary filter body for use in the pre-filter system shown in FIG. 1.

Figure 7:
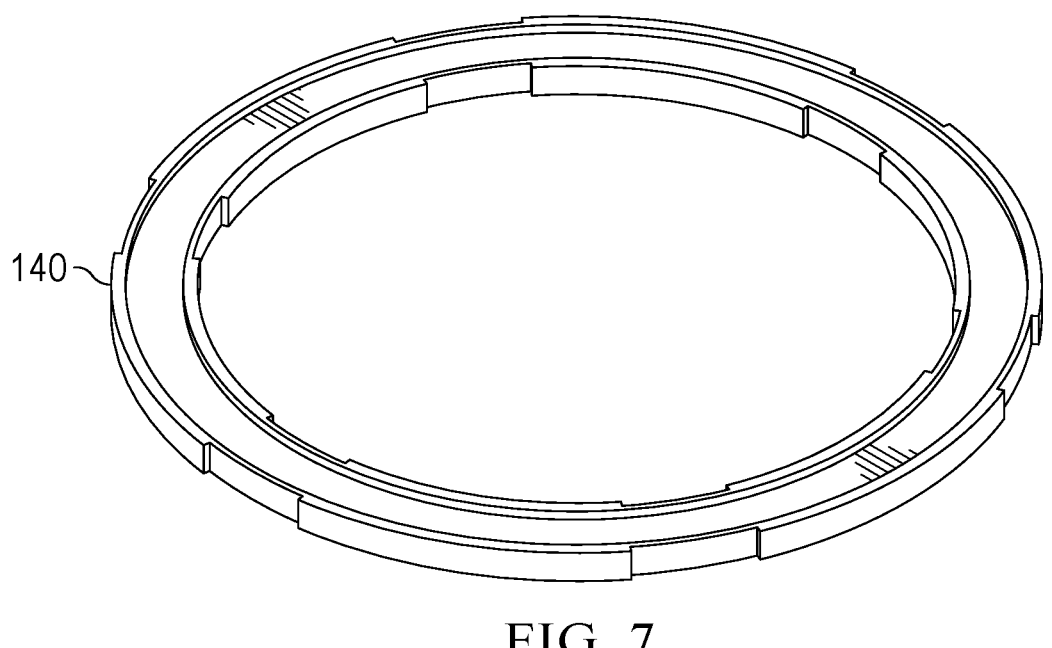

FIG. 7 is a perspective view of an exemplary ring for use in the pre-filter system shown in FIG. 1.

Figure 8:
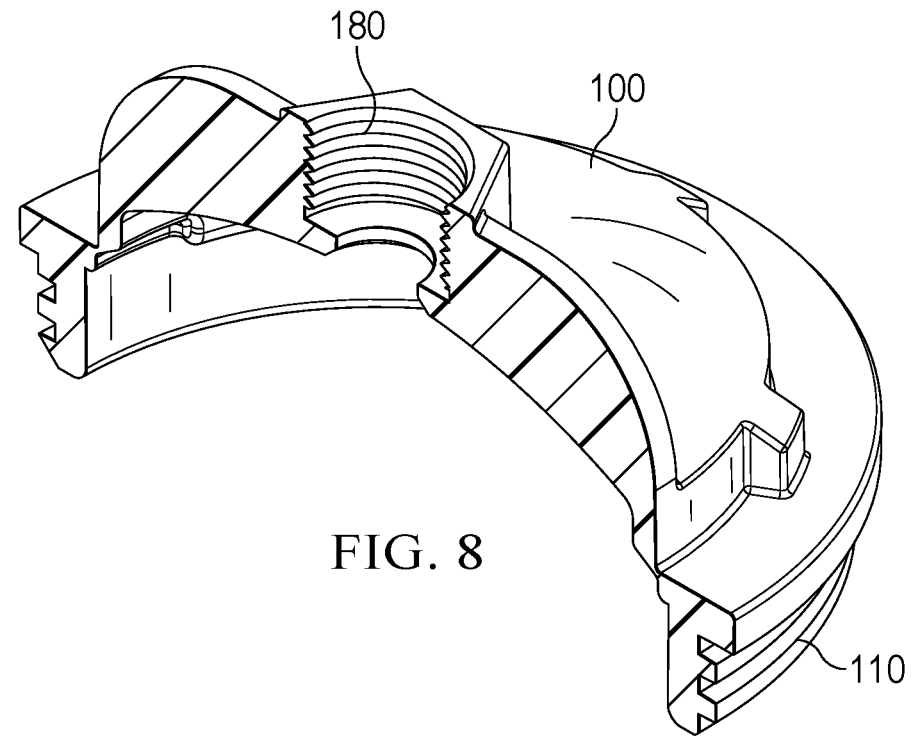

FIG. 8 is a perspective view in cross section of the exemplary cap shown in FIG. 5.

Figure 9:
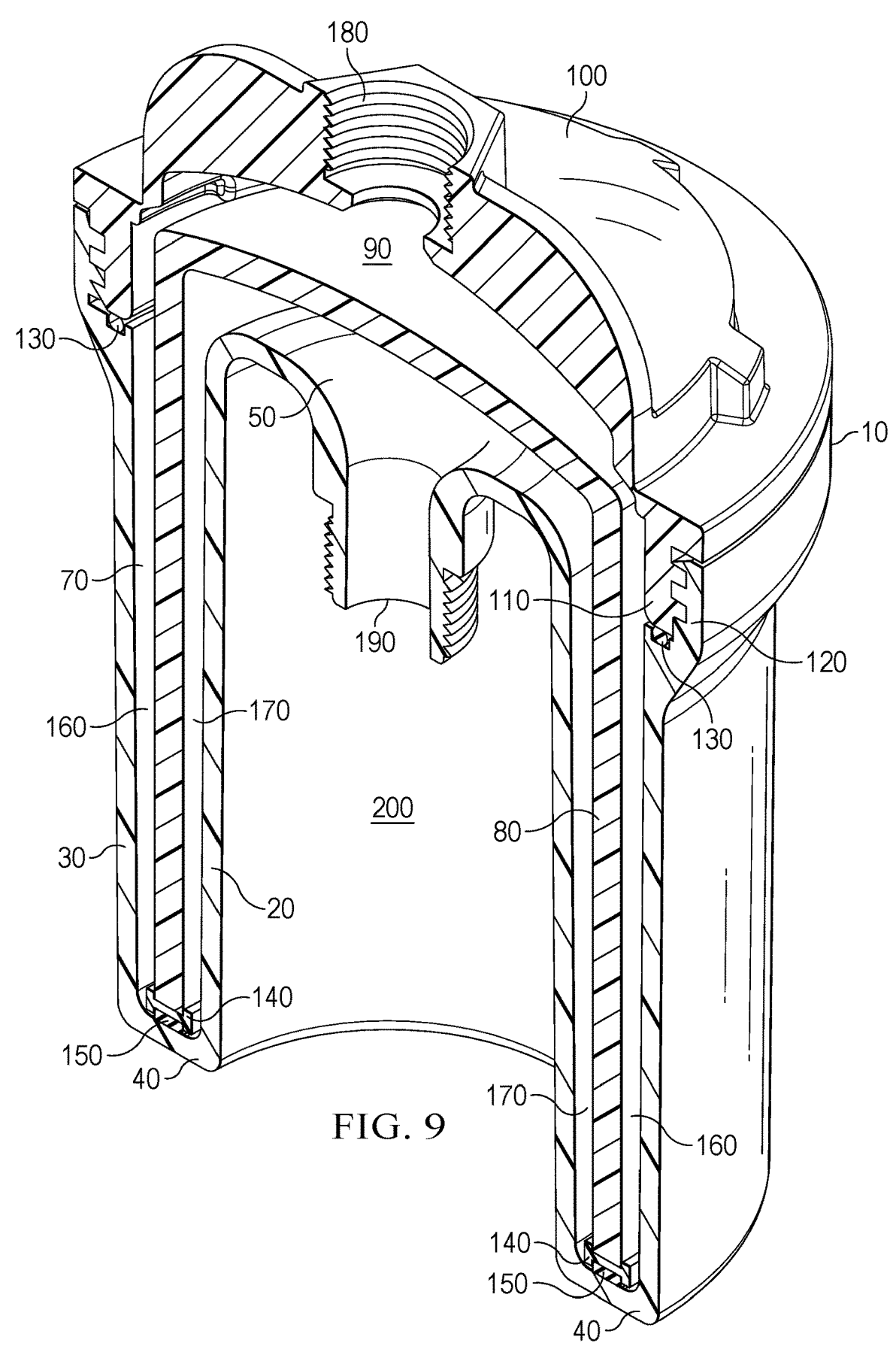

FIG. 9 is a perspective view in cross section of the exemplary pre-filter system shown in FIG. 1.

Figure 10:
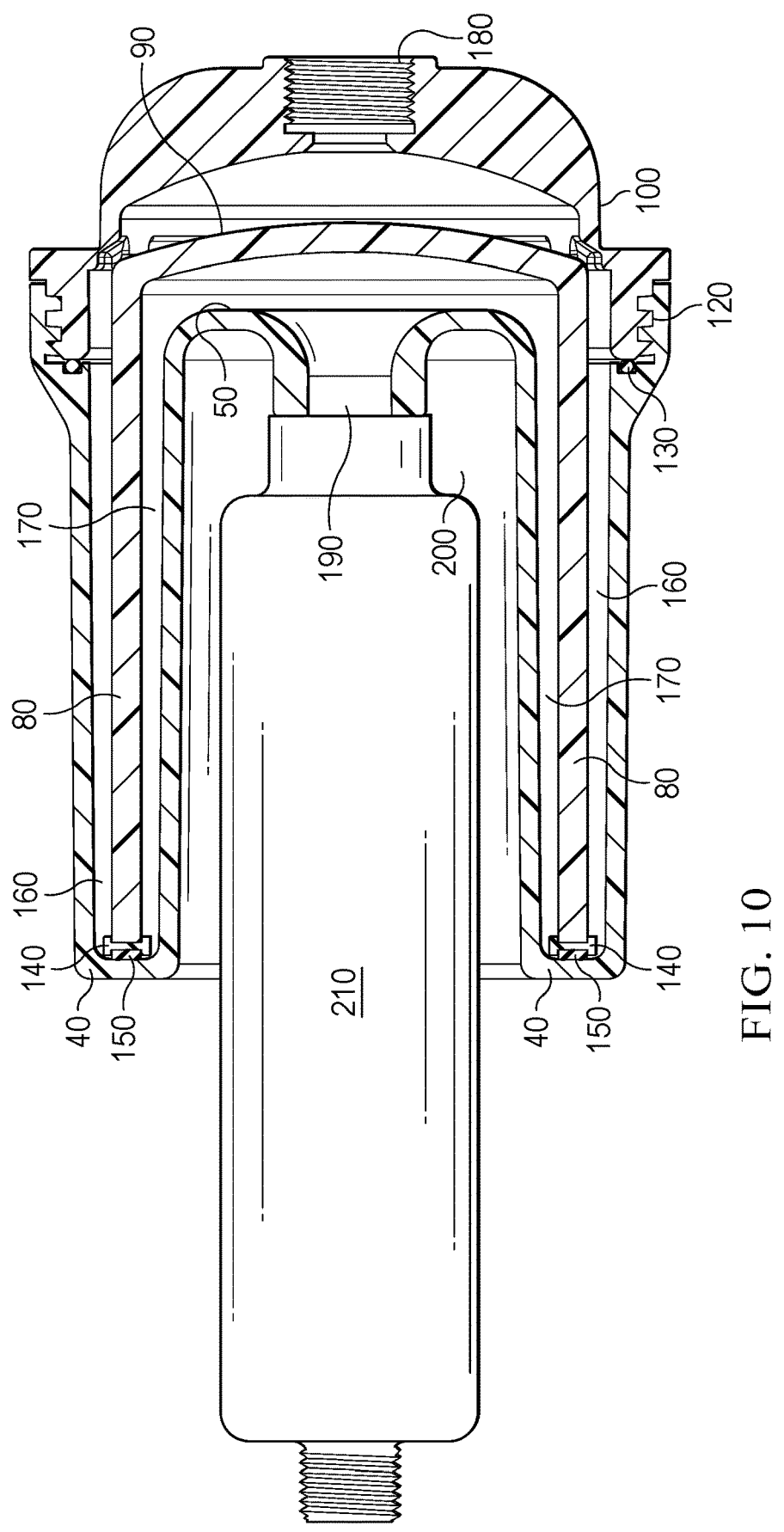

FIG. 10 is a side view in partial cross section of the exemplary pre-filter system shown in FIG. 1 placed in series with an inline filter.

Figure 11:
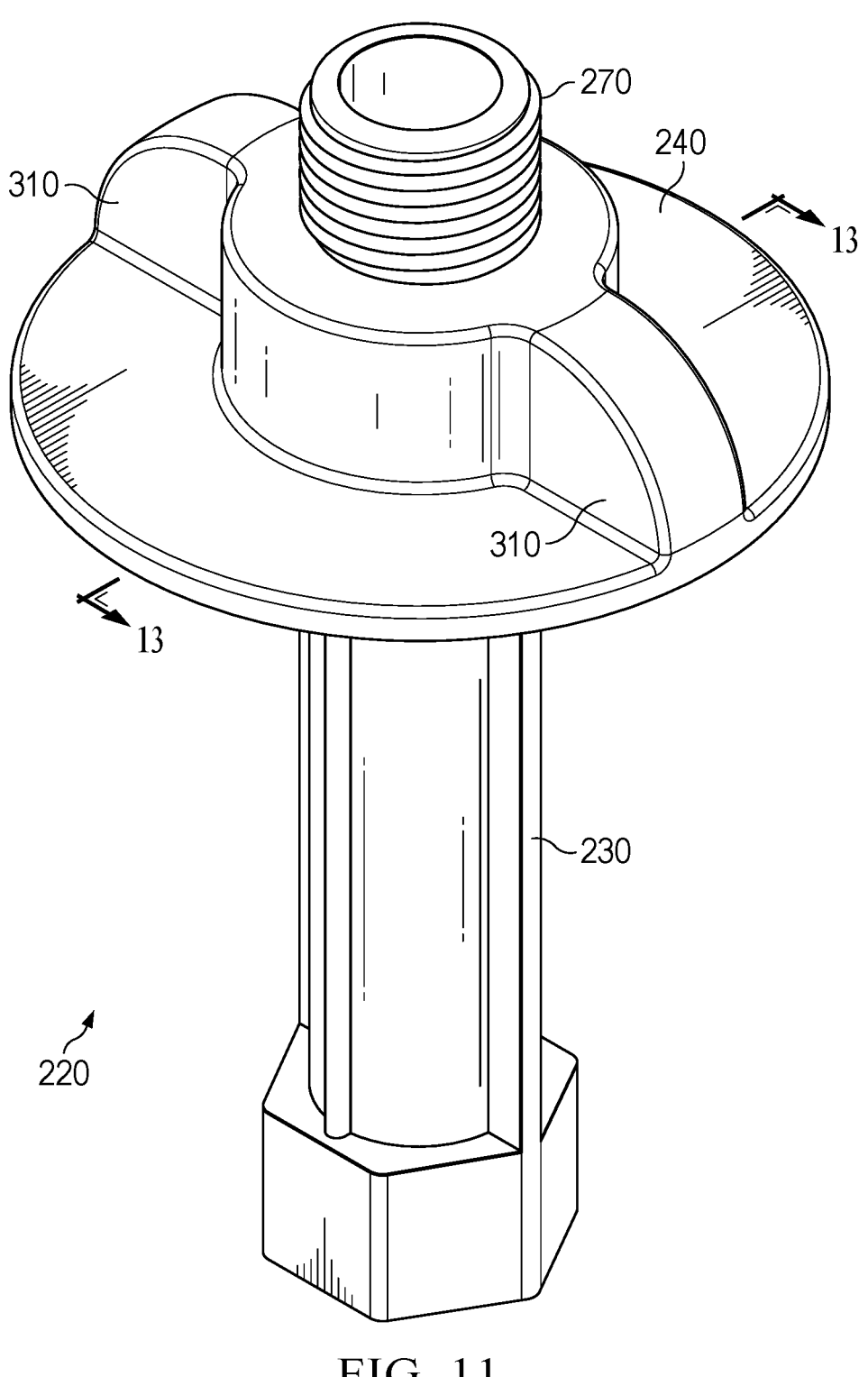

FIG. 11 is a perspective view of a backflushing adaptor for use with the exemplary pre-filter system shown in FIG. 1.

Figure 12:
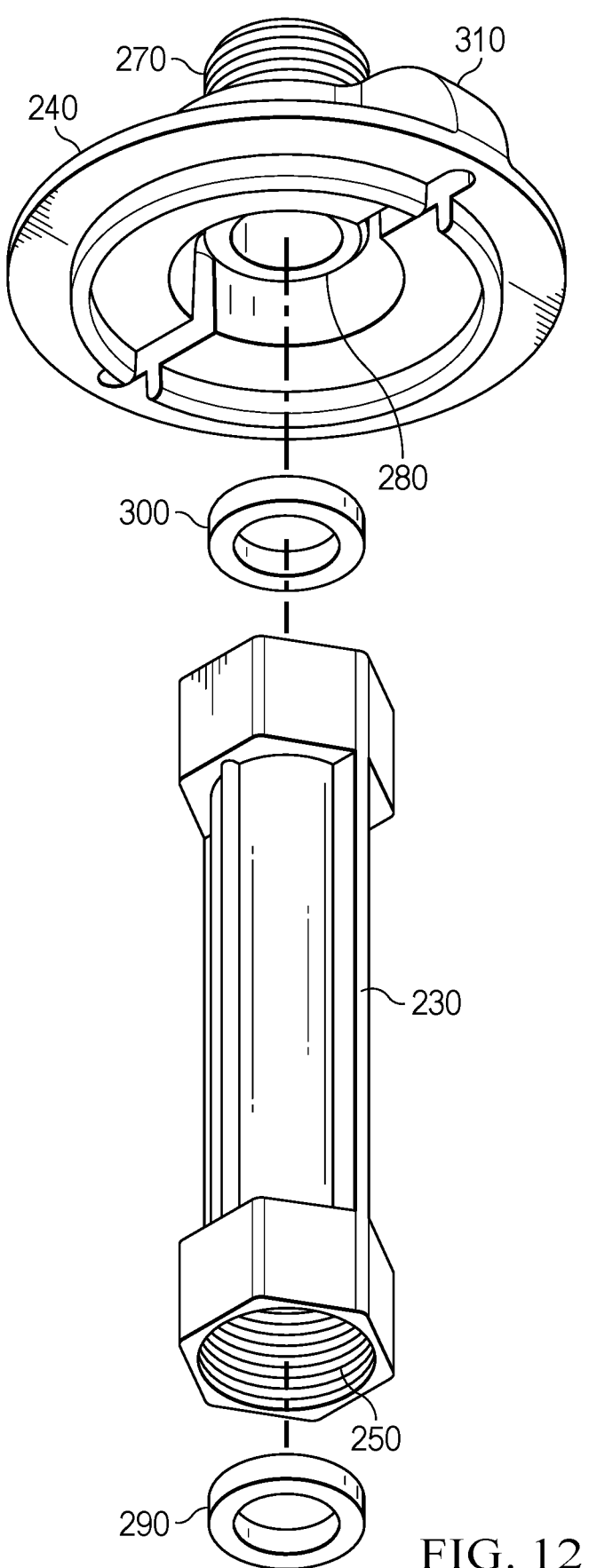

FIG. 12 is an exploded perspective view of the backflushing adaptor shown in FIG. 11.

Figure 13:
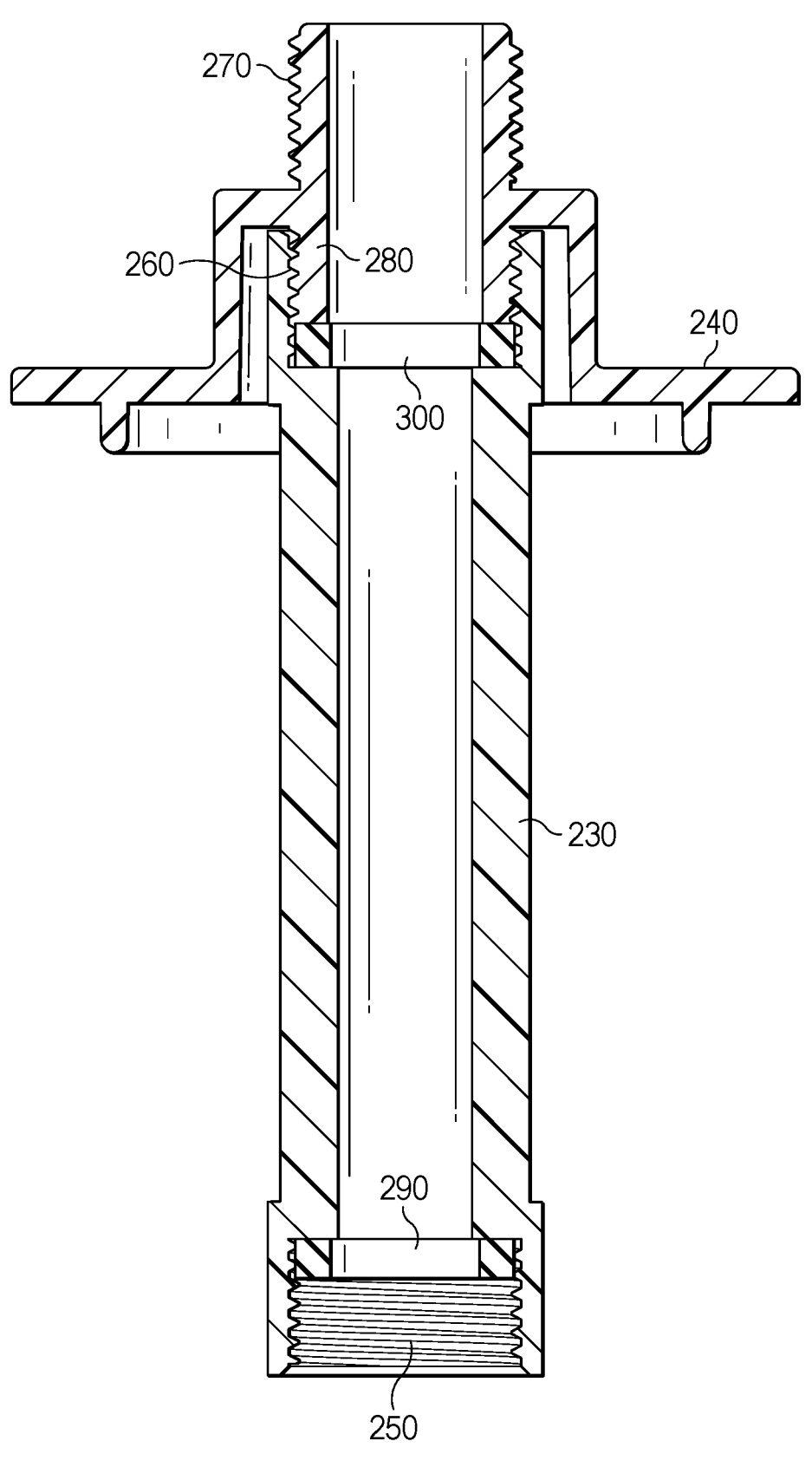

FIG. 13 is a cross-sectional view of the backflushing adaptor shown in FIG. 11 taken along the line 13-13 shown in FIG. 11.

DETAILED DESCRIPTION

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to water filtering; etc. Such aspects related to this disclosure do not depart from the invention, and it is therefore intended that the invention not be limited by the certain aspects set forth of the events and circumstances related to this disclosure.

Turning now to the drawings, an exemplary system and method for a consumer water pre-filter system for connection in series with an inline water filter is shown. The system comprises a housing 10 including an inner wall 20 and outer wall 30. The inner wall 20 and outer wall 30 at their lower portions are coupled together by lower end 40 of housing 10. A cover 50 closes off the upper portion of inner wall 20.

Between inner wall 20 and outer wall 30 an annular space 60 is provided that receives a portion of the filter body 70. The filter body 70 may be formed generally in the shape of an inverted cup, wherein the wall 80 of the cup is received within the annular space 60, and the bottom 90 of the cup extends across cover 50. The filter body 70 may be made of polyethylene (PE) granules that are compacted and sintered to form the shape of the filter body 70. The result is a filter that has a solid plastic appearance, but is porous with a pore size in one embodiment of approximately 20 micron.

A cap 100 may be provided that includes a threaded portion 110 that engages with the threaded portion 120 of the housing, which is positioned above the outer wall 30.

An o-ring 130 may be seated between the cap 100 and housing 10, to ensure a water-tight seal. Also, a ring 140 and ring seal 150 may be provided between the lower end of filter body 70 and the lower end 40 of housing 10, to prevent water from traveling around the lower end of the wall 80.

In an assembled configuration, a first fluid cavity 160 is formed separated from a second fluid cavity 170 by the filter body 70 including wall 80. A source of water is in fluid communication with first fluid cavity 160 via an inlet port 180. Water from the source may travel via inlet port 180 into first fluid cavity 160. From there, the water is filtered as it travels through filter body 70 into second fluid cavity 170. An exit port 190 in cover 50 allows water to pass from the second fluid cavity 170 into an inline filter 210 positioned at exit port 190.

As shown in the drawings, the housing 10 includes a cavity portion 200 inside inner wall 20 at exit port 190. In that way, all or a portion of an inline filter 210 may be received in the cavity portion 200, thus creating an overall compact arrangement of a pre-filter and inline filter filtration system.

Also, while the figures show a device that may be disassembled and cleaned for repeated use, the invention is not so limited. In an alternate embodiment a disposable pre-filter may be provided. In such an embodiment, threaded couplings may be replaced with fixed couplings, and the lower portion of the filter body 70 may be fixedly attached to the lower end 40 of housing 10 (making the ring 140 and ring seal 150 unnecessary). Fixed couplings may be achieved, by way of example, by use of an adhesive.

In another embodiment, the pre-filter may be used in connection with a backflushing adaptor 220 to allow for convenient backflush cleaning to permit repeated use of the pre-filter. As shown in FIGS. 11-13, the backflushing adaptor 220 includes an elongated tubular extension 230 and a backflushing adaptor cover 240. The extension 230 is adapted with female threads 250 on a first end and female threads 260 on an opposite second end. The cover 240 is adapted with male threads 270 on a first end and male threads 280 on an opposite second end.

In use, the first end of extension 230 is threadingly removably attached to to pre-filter exit port 190, which is adapted with male threads that mate with female threads 250. A flexible gasket or rubber seal 290 may be provided at the attachment point to prevent water leakage. The second end of extension 230 is threadingly removably attached to the second end of cover 240 by bringing together female threads 260 and male threads 280. Again, a flexible gasket or rubber seal 300 may be provided at the attachment point to prevent water leakage. The first end of the cover 240 is threadingly removably attached to inline filter 210 by mating male threads 270 with the female threads at the inlet of the inline filter 210.

To backflush the pre-filter, cover 240 is removed from extension 230 by disengaging female threads 260 and male threads 280. A pair of wings 310 may be provided to ease the turning of the cover 240 relative to extension 230. Then, a source of water (e.g., a garden hose) may be coupled to female threads 260 to supply the water used to backflush the pre-filter. Once backflushing is complete, the cover 240 and extension 230 are reattached for continued use.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. A water filter including:

(a) a pre-filter including:

(i) a housing body, the housing body including: an inner side wall; an outer side wall; a housing body lower end that couples a lower end of the inner side wall to a lower end of the outer side wall, wherein the inner side wall, outer side wall, and housing body lower end define at least a part of an annular space; and a cover over an upper end of the inner side wall, the cover including an exit port therethrough in fluid communication with the annular space;

(ii) a cup-shaped filter, wherein the wall of the cup-shaped filter is disposed within the annular space, the closed-end of the cup-shaped filter extends across the cover, and the open-end of the cup shaped filter is adjacent to the housing body lower end; and (iii) a cap disposed across the closed-end of the cup-shaped filter at the upper end of the outer side wall, the cap including an entry port therethrough that is in fluid communication with the annular space, wherein the filter separates the annular space into a first side for unfiltered water and a second side for filtered water;

(b) a backflushing adaptor at least partially disposed within a cavity formed at least in part by the housing body inner side wall, the backflushing adaptor including an elongated tubular extension and an adaptor cover, wherein the elongated tubular extension includes female threads on a first end and on a second end, and wherein the adaptor cover includes a fluid pathway therethrough having a first end with male threads that releasably engage with the female threads on the second end of the elongated tubular extension; wherein the female threads of the first end of the elongated tubular extension releasably engage with male threads at the exit port; wherein the fluid pathway through the adaptor cover has a second end with male threads; and (c) an inline filter with female threads removably coupled to male threads of the second end of the fluid pathway through the adaptor cover, wherein a continuous fluid pathway is formed from the entry port through the cup-shaped filter, through the exit port, through the backflushing adaptor, to the inline filter; and wherein the pre-filter may be backflushed by removing the adaptor cover from the second end of the elongated tubular extension and connecting a water hose to the second end of the elongated tubular extension.

2. The water filter of claim 1 including a continuous fluid pathway for water from a water source through the entry port to the annular space first side, through the filter, and to the annular space second side.

3. The water filter of claim 1 including an o-ring disposed between the cap and the upper end of the outer side wall.

4. The water filter of claim 3 including a ring and a ring seal disposed between the lower end of the filter and the housing body lower end.

* * * * *